United States Patent
Lee et al.

(10) Patent No.: US 7,330,664 B2
(45) Date of Patent: Feb. 12, 2008

(54) DATA TRANSMITTER AND METHOD OF GENERATING NONE RETURN TO ZERO OPTICAL SIGNAL WITH CLOCK COMPONENT AMPLIFICATION

(75) Inventors: Wangjoo Lee, Daejeon (KR); Hyunwoo Cho, Seoul (KR); Ki Ho Han, Busan (KR); Je Soo Ko, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 583 days.

(21) Appl. No.: 10/860,903

(22) Filed: Jun. 3, 2004

(65) Prior Publication Data

US 2005/0095002 A1    May 5, 2005

(30) Foreign Application Priority Data

Nov. 5, 2003    (KR) ................ 2003-78116

(51) Int. Cl.
*H04B 10/04* (2006.01)
*H04B 10/00* (2006.01)

(52) U.S. Cl. ............................... 398/186; 398/155
(58) Field of Classification Search ............... 398/140, 398/155, 186
See application file for complete search history.

(56) References Cited

U.S. PATENT DOCUMENTS 5,214,641 A * 5/1993 Chen et al. ............... 370/484
6,711,360 B1 * 3/2004 Wu ............................. 398/182
2004/0067063 A1 * 4/2004 Lee et al. ................... 398/155
2004/0076440 A1 * 4/2004 Wedding .................... 398/188

FOREIGN PATENT DOCUMENTS

JP    10-209960    8/1998
KR   1020030047966 A   6/2003

OTHER PUBLICATIONS

Wangjoo Lee et al., "40GHz clock generation using optical processing and the transmission distance enhancement scheme" COIN/ACOFT 2003, Conference on the Optical Internet/Australian Conference on Optical Fibre Technology 2003 Jul. 13-16, 2003 (pp. 561-563).
Chang-Hee Lee et al., "Passive all-optical clock signal extractor for non-return-to-zero signals", Electronics Letters, Feb. 5, 1998, vol. 34, No. 3 (pp. 295-297).

* cited by examiner

*Primary Examiner*—Jason Chan
*Assistant Examiner*—Quan-Zhen Wang
(74) *Attorney, Agent, or Firm*—Blakely Sokoloff Taylor & Zafman

(57) ABSTRACT

The present invention relates to none return to zero (NRZ) modulation method. The NRZ optical modulation is performed by combining a clock signal and NRZ data at a sending end and signal distortion capable of being generated when the clock signal and the NRZ data are combined is optimized by controlling the magnitude and phase of the clock signal. At the receiving end, the clock signal is extracted by performing narrow band band-pass filtering of the detected optical signal transmitted from a transmitter and data is recovered using the clock signal. Therefore, a receiver structure for clock extraction is simpler, an error rate of data recovery is lower by clearly extracting the clock signal, and transmission distance of the optical signal is longer.

2 Claims, 8 Drawing Sheets

500

FIG. 9
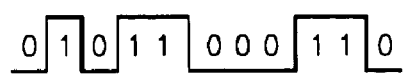
(a)
(b)
(c)
(d)
FIG. 10
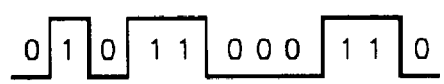
(a)
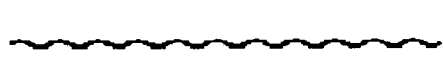
(b)
(c)
(d)

DATA TRANSMITTER AND METHOD OF GENERATING NONE RETURN TO ZERO OPTICAL SIGNAL WITH CLOCK COMPONENT AMPLIFICATION

BACKGROUND OF THE INVENTION

This application claims priority from Korean Patent Application No. 2003-78116, filed on Nov. 5, 2003, in the Korean Intellectual Property Office, the disclosure of which is incorporated herein in its entirety by reference.

1. Field of the Invention

The present invention relates to a digital optical communication system, and more particularly, to non-return to zero (NRZ) modulation method.

2. Description of the Related Art

In a digital optical communication system, a sending end outputs optical signal data synchronized by its own clock and a receiving end recovers the received data. In a digital communication system, data recovery is to read input data at every instant pointed by the clock signal and to judge whether the input data value is "0" or "1". Even if a clock frequency of the receiving end is a little bit different from a clock frequency of the sending end, data cannot be normally recovered. Therefore, almost all receivers use a clock for data recovery by extracting the clock from the input data not to have own clock.

Nowadays, in 2.5 Gbps and 10 Gbps electrical time division multiplexing (ETDM) optical transmission system, optical transmission using an NRZ modulation method is usually used. The NRZ modulation method has a simple configuration and price competition in comparison to the other modulation methods. However, since NRZ data does not have any frequency component corresponding to the clock signal, there's no straightforward method of extracting clock signal from NRZ data.

A clock extracting method, which is generally used in a digital communication system using the NRZ modulation method, uses a phase locked loop (PLL) component. However, considering systems, whose transmission rate is more than 10 Gbps such as 40 Gbps, it is very difficult to manufacture an electrical component, such as the PLL and also the price of the component becomes very expensive even though the component can be manufactured.

SUMMARY OF THE INVENTION

The present invention provides a data transmitter and method of modulating an optical signal in a sending end so as to easily extract a clock in a receiving end of an optical communication system with an NRZ modulated data using a low price band-pass filter easy to manufacture instead of a high price PLL difficult to manufacture.

According to an aspect of the present invention, there is provided a data transmitter including: an attenuator which attenuates the magnitude of an electrical clock signal; a phase shifter which controls the phase of the magnitude-attenuated electrical clock signal; a combiner which combines the phase-controlled electrical clock signal and electrical NRZ data; a driver which amplifies the magnitude of the combined signal; and an optical modulator which performs NRZ optical modulation of the combined signal amplified by the driver.

According to another aspect of the present invention, there is provided a data transmitter including: an attenuator which attenuates the magnitude of an electrical clock signal; a phase shifter which controls the phase of the magnitude-attenuated electrical clock signal; a driver which amplifies the magnitude of electrical NRZ data; and an optical modulator with dual RF input ports which performs NRZ optical modulation of the electrical NRZ data and the electrical clock signal by receiving the electrical NRZ data from the driver and the phase-controlled electrical clock signal from the phase shifter.

According to another aspect of the present invention, there is provided a data transmitting method including: attenuating the magnitude of an electrical clock signal; controlling the phase of the magnitude-attenuated electrical clock signal; combining the phase-controlled electrical clock signal and electrical NRZ data; amplifying the magnitude of the combined signal; and performing an NRZ optical modulation of the combined signal amplified by the driver.

According to another aspect of the present invention, there is provided a data transmitting method including: attenuating the magnitude of an electrical clock signal; controlling the phase of the magnitude-attenuated electrical clock signal; amplifying the magnitude of electrical NRZ data; and performing an NRZ optical modulation of the amplified electrical NRZ data and the phase-controlled electrical clock signal.

BRIEF DESCRIPTION OF THE DRAWINGS

The above and other features and advantages of the present invention will become more apparent by describing in detail exemplary embodiments thereof with reference to the attached drawings in which:

FIG. 9 is a waveform of a modulation signal combined without regard to the magnitude of two signals of electrical NRZ data and a clock signal in a transmitter;

FIG. 10 is a waveform of a modulation signal multiplexed regarding to the magnitude and phase differences of the NRZ data and the clock signal;

DETAILED DESCRIPTION OF THE INVENTION

Figure 1:
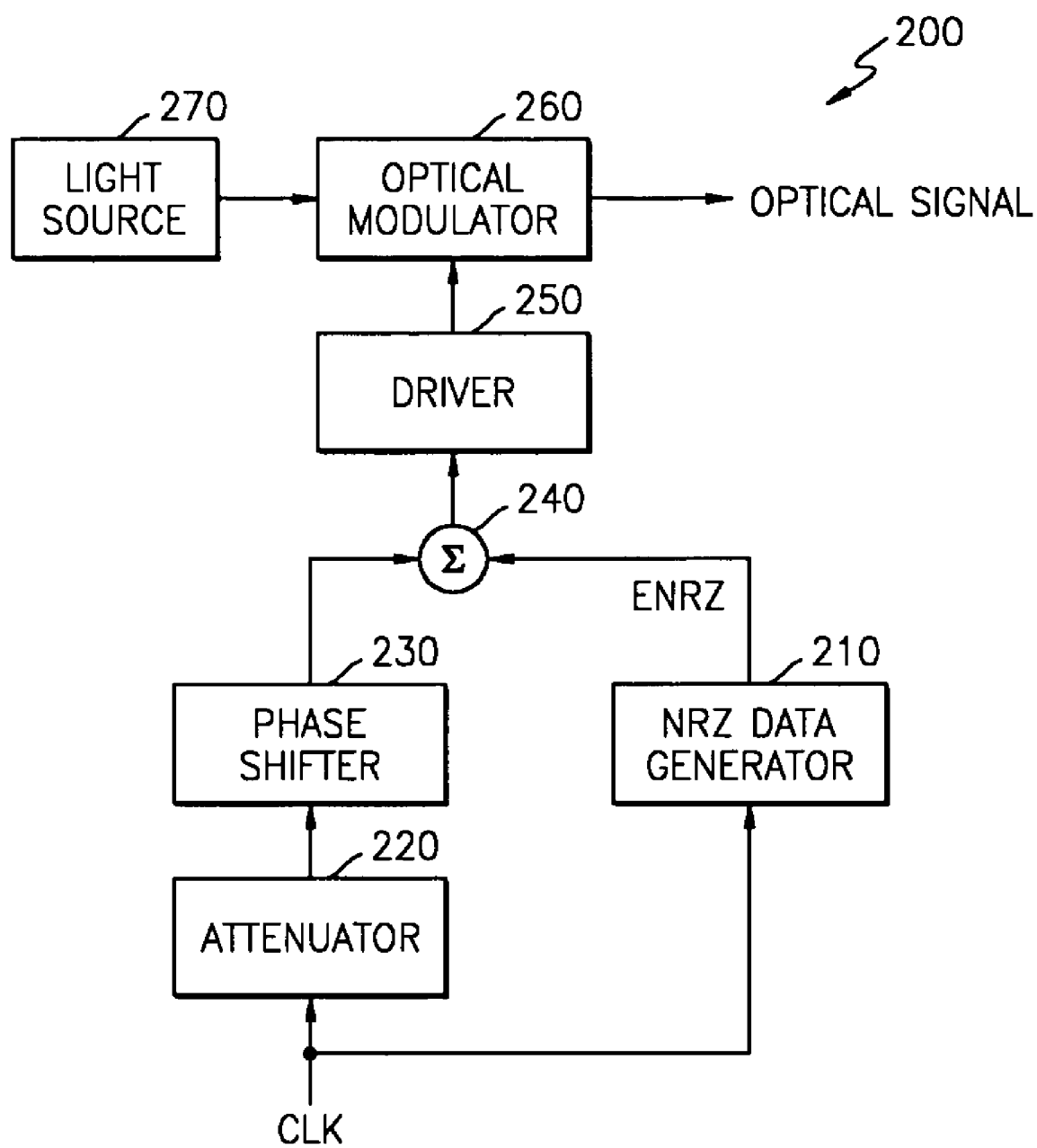
FIG. 1 is a block diagram of a transmitter according to a preferred embodiment of the present invention.
Figure 2:
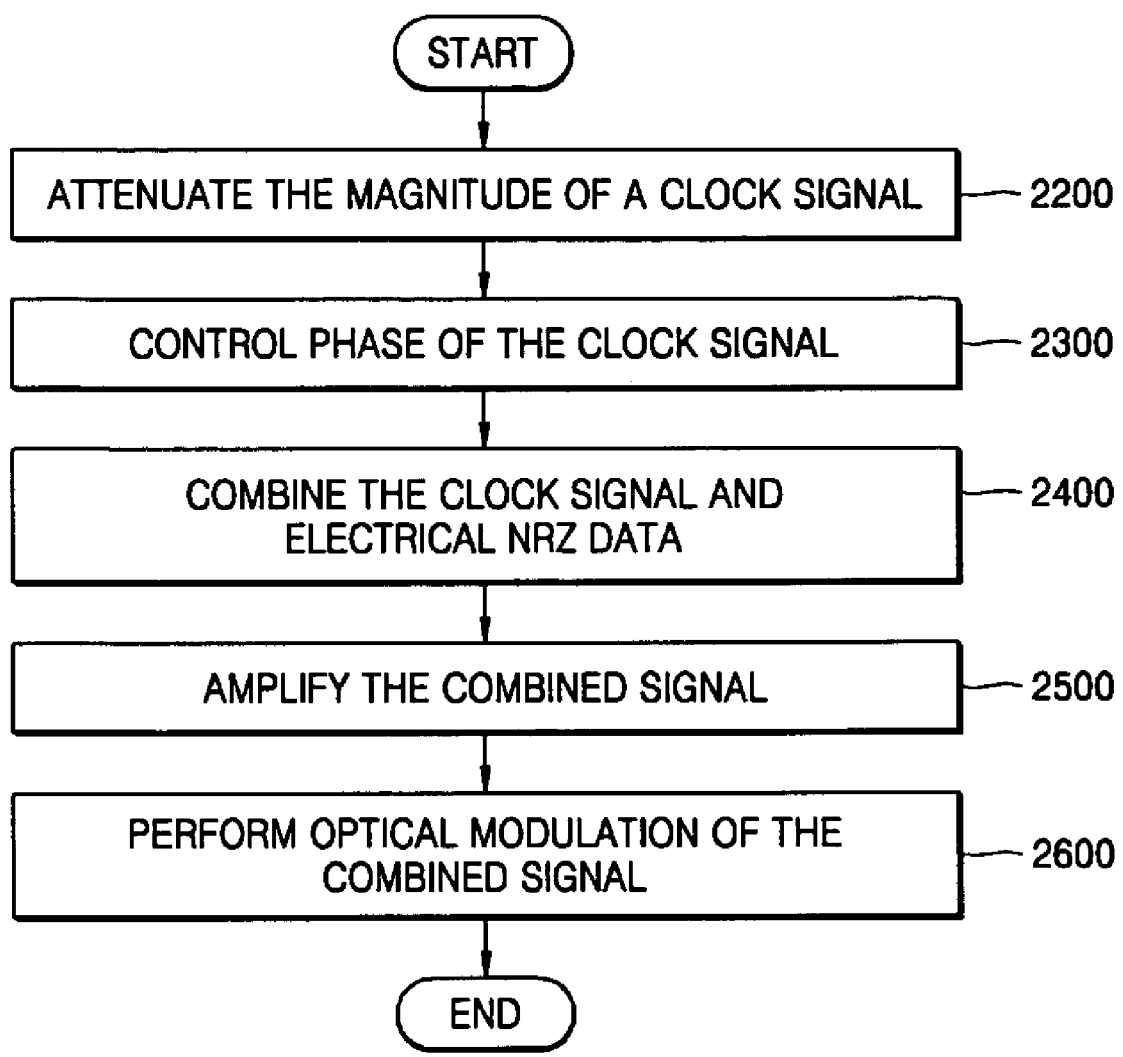
FIG. 2 is a flowchart of an optical modulation method performed in the transmitter of FIG. 1.

FIG. 1 is a block diagram of a transmitter 200 according to a preferred embodiment of the present invention. FIG. 2 is a flowchart of an optical modulation method performed in the transmitter 200 of FIG. 1.

With reference to FIG. 1, the transmitter 200 includes an NRZ data generator 210, an attenuator 220, a phase shifter 230, a combiner 240, a driver 250, an optical modulator 260, and a light source 270.

The NRZ data generator 210 generates electrical NRZ data ENRZ synchronized with an electrical clock signal CLK. The attenuator 220 receives the clock signal CLK and appropriately attenuates the magnitude of the clock signal CLK before the clock signal CLK and the NRZ data ENRZ are combined. The phase shifter 230 receives the clock signal magnitude-attenuated by the attenuator 220, appropriately controls a phase of the attenuated clock signal.

The combiner 240 combines the electrical clock signal from the phase shifter 230 and the electrical NRZ data ENRZ generated from the NRZ data generator 210. The driver 250 amplifies the signal input from the combiner 240 and outputs the amplified signal to the optical modulator 260. The optical modulator 260 generates an NRZ modulated optical signal of the light emitted from the light source 270 in response to the output signal of the driver 250.

If distortion of an optical signal waveform occurred exceedingly due to data and clock combined modulation of optical signal, it is difficult to reliably recover data with an extracted clock signal though the clock signal extraction is easy in the receiver. For the control range of the magnitude and phase of the clock signal CLK by the attenuator 220 and the phase shifter 230, values determined by experiments are used.

With reference to FIG. 2, an optical modulation procedure performed in the transmitter 200 of FIG. 1 is described.

First, the magnitude of the clock signal CLK is appropriately attenuated in step 2200 through the attenuator 220 (for example, about one tenth the magnitude of the NRZ data ENRZ). The phase of the clock signal CLK is appropriately controlled in step 2300 through the phase shifter 230 (for example, 90° phase shift). The controlled clock signal CLK and the NRZ data ENRZ are combined in step 2400 through the combiner 240. The combined signal is amplified in step 2500 through the driver 250. Finally, the amplified signal is applied to the optical modulator 260 in step 2600 for the optical signal modulation.

The result is that since the transmitter 200 modulates optical signal using the combined electrical signal of clock and NRZ data where the clock signal is magnitude and phase controlled through the attenuator 220 and the phase shifter 230 before the electrical clock signal CLK and the electrical NRZ data ENRZ are combined, the optical signal output of the transmitter 200 contains bigger clock component with respect to typical NRZ modulated optical signal does. Thereby, the receiver receiving the optical signal can easily extract the clock signal from the received optical signal. Moreover, data recovery errors are minimized by minimizing signal waveform distortion capable of being generated by clock component amplification of the optical signal.

Figure 3:
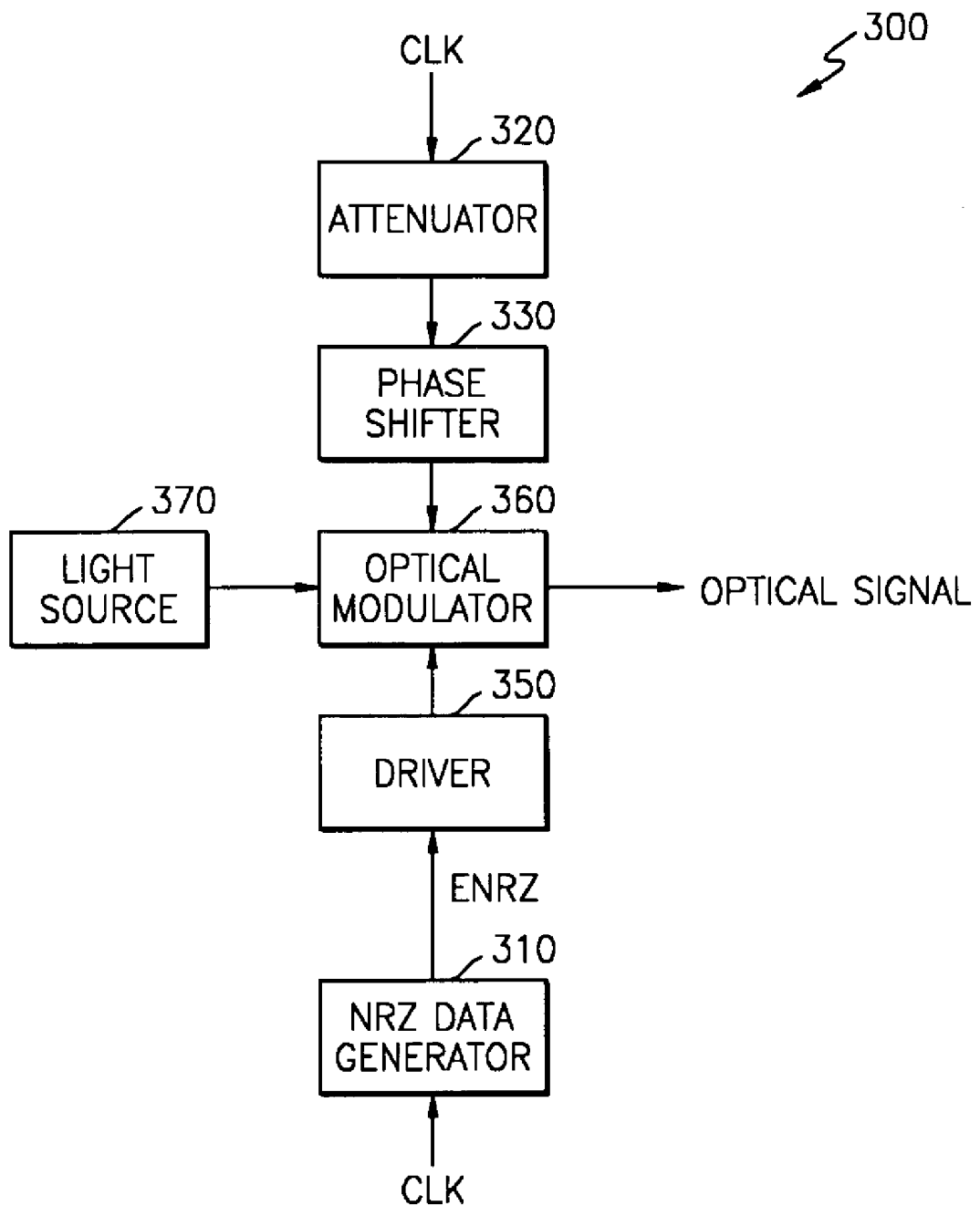
FIG. 3 is a block diagram of a transmitter according to another embodiment of the present invention.
Figure 4:
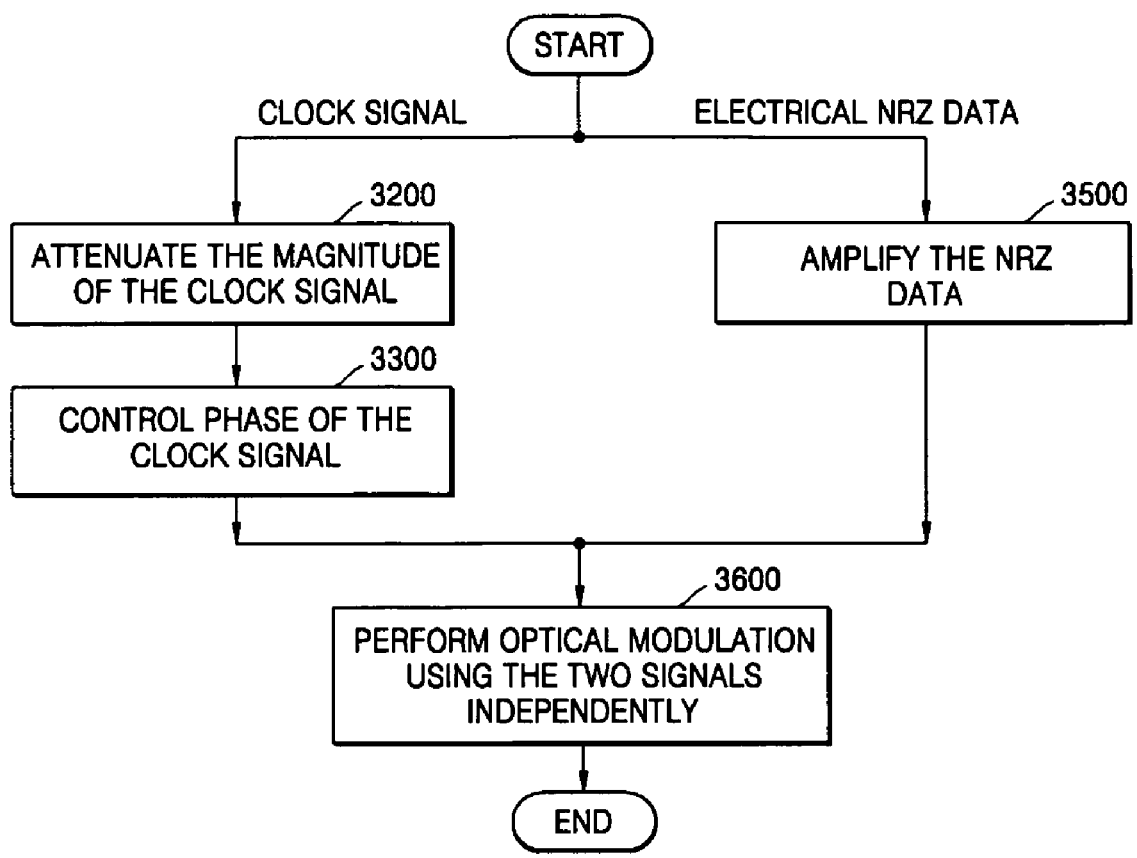
FIG. 4 is a flowchart of an optical modulation method performed in the transmitter of FIG. 3.

FIG. 3 is a block diagram of a transmitter 300 according to another embodiment of the present invention. FIG. 4 is a flowchart of an optical modulation method performed in the transmitter 300 of FIG. 3.

With reference to FIG. 3, the transmitter 300 includes an NRZ data generator 310, an attenuator 320, a phase shifter 330, a driver 350, an optical modulator 360 having two high frequency signal input ports, and a light source 370.

The NRZ data generator 310 generates electrical NRZ data ENRZ synchronized to a clock signal CLK. The driver 350 receives the NRZ data ENRZ from the NRZ data generator 310, amplifies the data to a predetermined level, and outputs the amplified data to one input port of the optical modulator 360.

The attenuator 320 receives an electrical clock signal CLK and appropriately attenuates the magnitude of the clock signal CLK. The phase shifter 330 receives the magnitude-attenuated clock signal from the attenuator 320, appropriately controls the phase of the magnitude-attenuated clock signal, and minimizes signal distortion capable of being generated when the optical modulation is performed. The clock signal CLK, whose magnitude and phase is controlled by the attenuator 320 and the phase shifter 330, is input to the other input port of the optical modulator 360.

The optical modulator 360, which is driven by the electrical NRZ data ENRZ and the electrical clock signal CLK through the two input ports, generates clock component amplified NRZ optical signal of the light emitted from the light source 370 in response to the two input modulating signals.

With reference to FIG. 4, an optical modulation procedure performed in the transmitter 300 of FIG. 3 is described.

First, the magnitude of the clock signal CLK is appropriately attenuated in step 3200 through the attenuator 320 (for example, about one tenth the magnitude of the NRZ data ENRZ). The phase of the clock signal CLK is appropriately controlled in step 3300 through the phase shifter 330 (for example, 90° phase shift). The NRZ data ENRZ is amplified in step 3500 through the driver 350 while the magnitude and phase of the clock signal CLK is being controlled. Finally, the magnitude and phase controlled clock signal and the magnitude amplified NRZ data are input to the optical modulator 360 and converted to the NRZ modulated optical signal in step 3600.

With reference to FIGS. 1 through 4, according to the number of high frequency input ports of the optical modulators 260, 360 included in the transmitters 200, 300, structures and optical modulation methods of the transmitters 200, 300 are a little bit different. However, types of the modulated optical signals are all the same and a clock component included in the optical signal generated from the transmitters 200, 300 is more amplified than a clock component by a conventional NRZ modulation.

Figure 5:
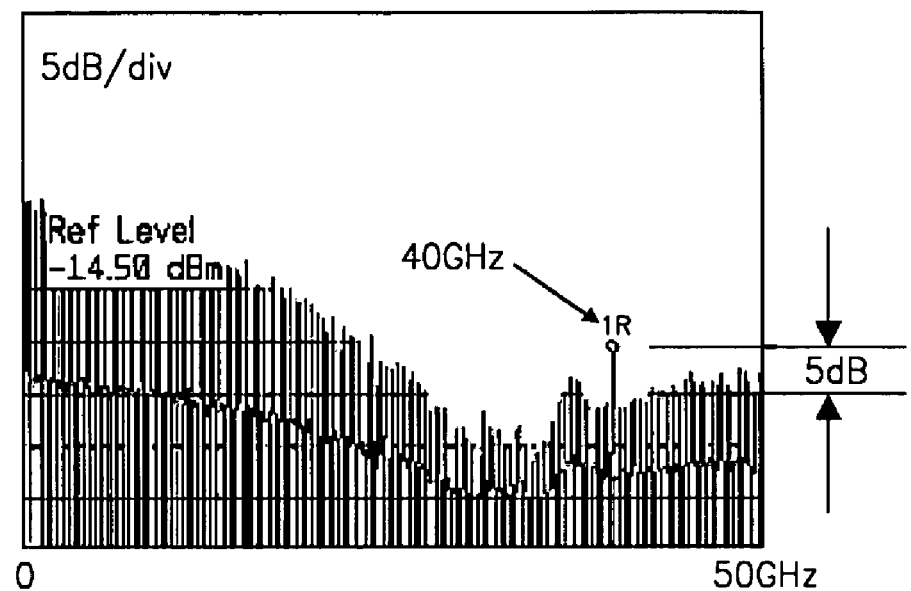
FIG. 5 is a RF spectrum result where a 40 Gbps optical signal modulated by a conventional NRZ optical modulation method is detected at a receiver.
Figure 6:
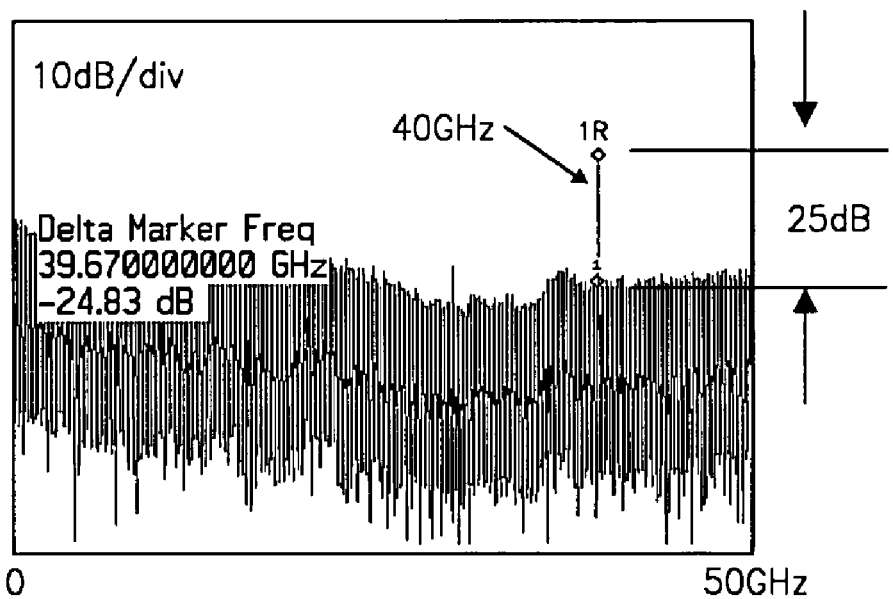
FIG. 6 is a RF spectrum result where a 40 Gbps optical signal modulated by the transmitters of FIGS. 1 and 3 is detected at a receiver.

FIG. 5 is a RF spectrum result where a 40 Gbps optical signal modulated by a conventional NRZ optical modulation method is detected at a receiver. FIG. 6 is also a RF spectrum result where a 40 Gbps optical signal modulated by the transmitters 200, 300 of FIGS. 1 and 3 is detected at a receiver.

With reference to FIGS. 5 and 6, in a case where the modulation method according to the present invention is adapted, much larger peak component than that of the optical signal modulated by the conventional modulation method is generated at 40 GHz, a clock frequency. Since one scale of the vertical axis of FIG. 5 is 5 dB and one scale of the vertical axis of FIG. 6 is 10 dB, the difference can be seen more exactly. That is, since the NRZ optical signal generated by the optical modulation method according to the present invention has larger clock frequency component than the optical signal generated by the conventional NRZ modulation method has, it is much easier that the receiver extracts the clock signal from the input optical signal.

Figure 7:
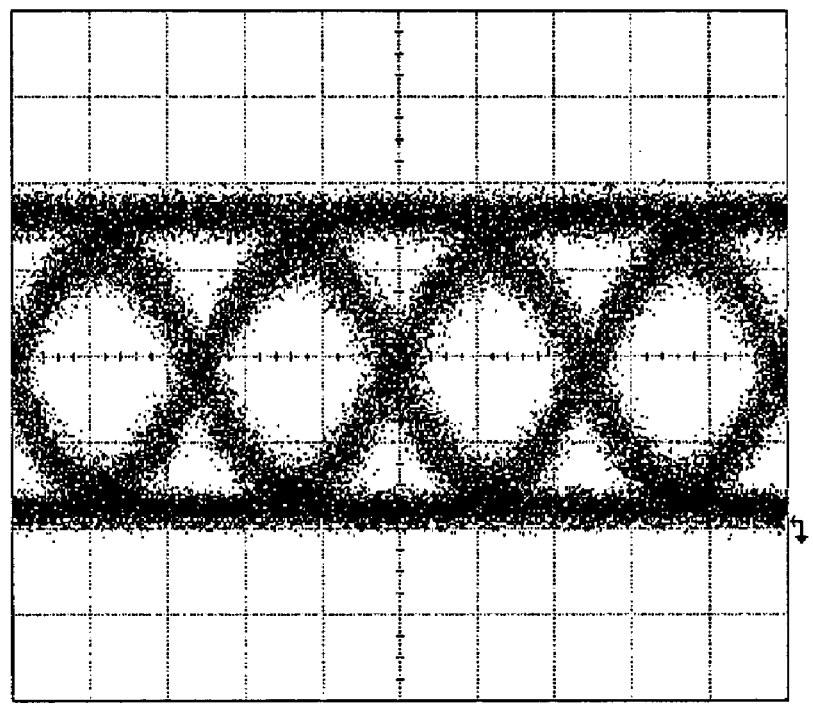
FIG. 7 is an output waveform of an NRZ optical signal generated by a conventional transmitter.
Figure 8:
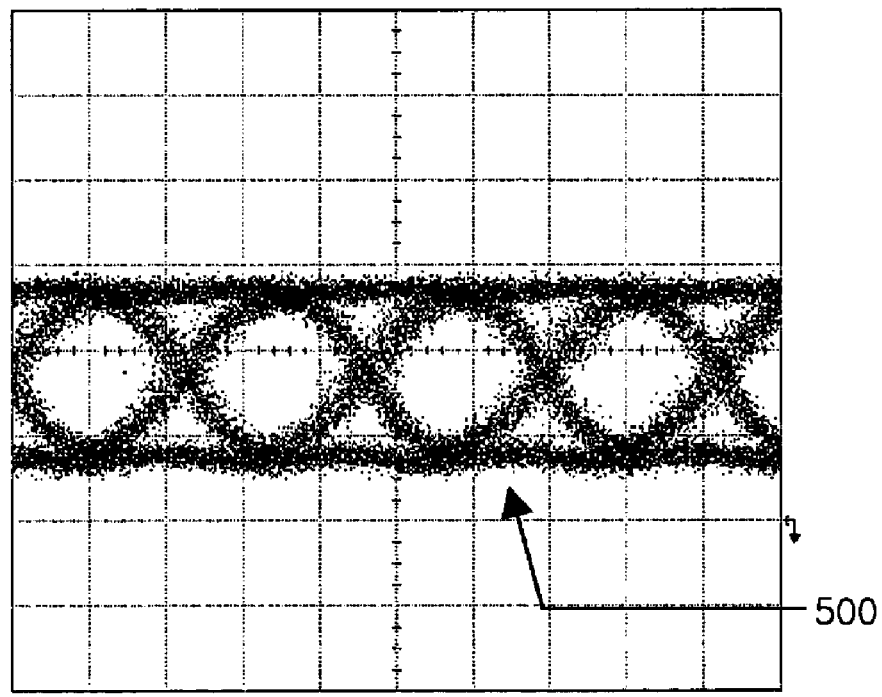
FIG. 8 is an output waveform of an NRZ optical signal generated by the transmitters of FIGS. 1 and 3.

FIG. 7 is an output waveform of an NRZ optical signal generated by a conventional transmitter. FIG. 8 is an output waveform of an NRZ optical signal generated by the transmitters 200, 300 of FIGS. 1 and 3.

With reference to FIGS. 7 and 8, a waveform of an NRZ optical signal with an amplified clock signal component according to the modulation method of the present invention (refer to FIG. 8) rarely has distortion but has clock frequency component of nearly 100 times larger signal to noise ratio than a conventionally NRZ modulated optical signal (refer to FIGS. 5 and 6)

However, if the clock signal CLK is simply combined with the electrical NRZ data without control of the magnitude and phase, the modulated optical signal can be harmfully distorted resulting in high data error rate in the receiving side. In the present invention, to prevent the harmful distortion from being generated, the modulation is performed after the magnitude and phase of the combined clock signal CLK is appropriately controlled through the attenuators 220, 320 and the phase shifters 230, 330. Therefore, the distortion is rarely generated on an optical waveform of the modulated optical signal and also it is easier to extract the clock signal at the receiving end.

FIG. 9 is a waveform of a modulation signal without regard to the magnitude of two signals when electrical NRZ data and a clock signal are combined in a transmitter. FIG. 10 is a waveform of a modulation signal combined regarding to the magnitude and phase differences of the NRZ data and the clock signal.

With reference to FIG. 9, (a) shows electrical NRZ data waveform corresponding to "01011000110", (b) shows a clock signal waveform having the same magnitude as the NRZ data waveform of (a), (c) shows a waveform of a combined modulation signal of the waveforms of (a) and (b), and (d) shows a combined waveform of the NRZ data of (a) and the 90° phase shifted clock signal of (b).

In the waveforms of (c) and (d), the magnitudes of the contained clock component is large. However, if the combined signal, such as the waveforms of (c) and (d), is used for optical modulation, an error rate of data recovery at the receiving end is much higher due to the severe waveform distortion.

Since the transmitters 200, 300 according to the present invention appropriately control the magnitude and phase of the clock signal combined with the NRZ data, waveform distortion is optimized. The detail description is as follows.

With reference to FIG. 10, (a) shows electrical NRZ data waveform corresponding to "01011000110", (b) shows a clock signal waveform having one tenth the magnitude of the NRZ data waveform of (a), (c) shows a combined waveform of the waveforms of (a) and (b), and (d) shows a combined waveform of the NRZ data of (a) and a signal that 90° phase transition is performed for the clock signal of (b).

Such as in the waveforms of (c) and (d), if the clock signal is combined with the NRZ data after the magnitude and phase of the clock signal is controlled, waveform distortion is rarely generated. Referring to (c) and (d) of FIG. 10 the effect of relative phase relation of NRZ data and clock signal is not clearly seen. Nevertheless, since surprisingly tight standards of error rate such as one error in ten-billion number of data bits is usually required in the optical communication, even minute difference between the waveforms of (c) and (d) largely affects whether the standard error rate is satisfied or not. Therefore, to fulfill more accurate error rate, it is preferable that both of magnitude and phase of the clock signal should be controlled.

Figure 11:
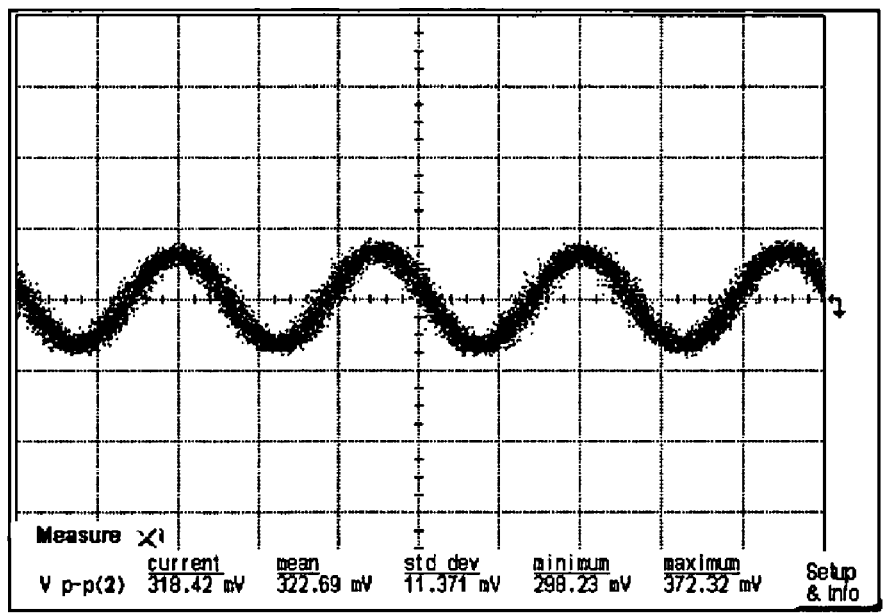
FIG. 11 is a waveform of a clock extracted by a clock extracting circuit from a 40 Gbps optical signal modulated by the transmitters of FIGS. 1 and 3.

FIG. 11 is a waveform of a 40 GHz clock signal extracted from a 40 Gbps optical signal modulated by the transmitters 200, 300 of FIGS. 1 and 3 in a receiver. The clock signal was extracted by transmitting a 40 Gbps NRZ optical signal, whose clock frequency component is amplified by the optical modulation method of the present invention, to 240 km away, detecting the optical signal with a optical detector of the receiver, and passing the detected signal now in electrical form through a narrow band band-pass filter of 40 GHz center frequency. That is, if a simple circuit, such as the narrow band band-pass filter, is added to the receiver, the clock signal included in the received optical signal is easily extracted with a clear waveform.

Figure 12:
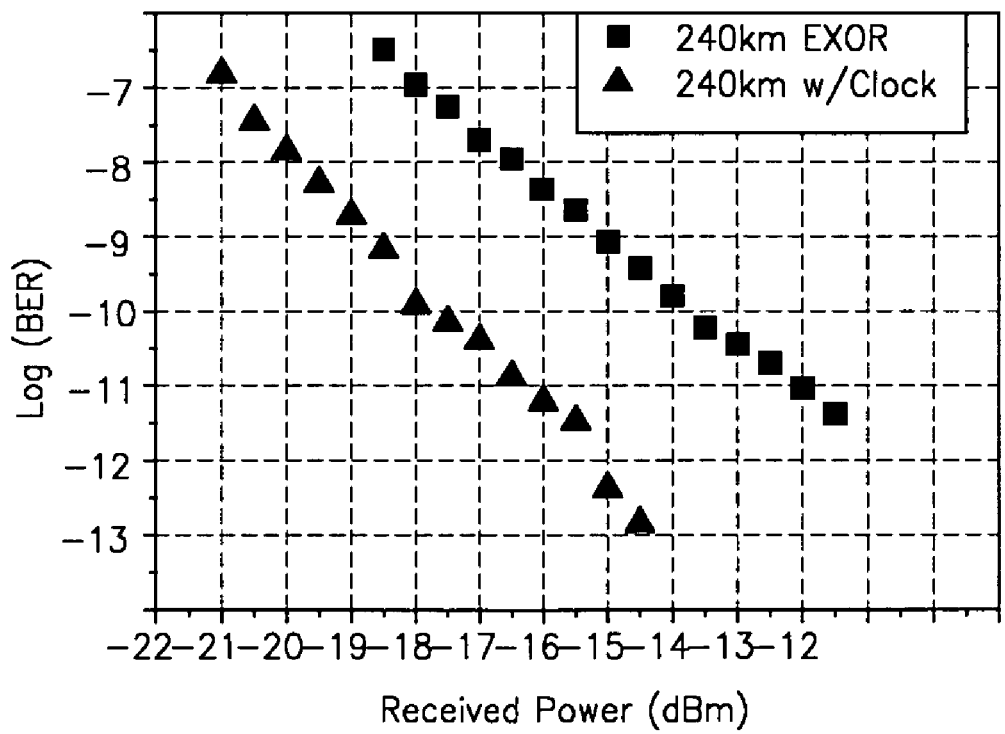
FIG. 12 shows a receiving error rate where the clock signal for data recovery is extracted by the present invention and a receiving error rate where the clock signal for data recovery is extracted by a convention method of using a non-linear device (exclusive-or) for clock component generation and band-pass filtering it.

FIG. 12 shows an error rate (▲) of a case where data is recovered by extracting a clock signal from optical data transmitted from the transmitter according to the present invention and an error rate (■) of a case where data is recovered by extracting a clock signal by a conventional method of performing exclusive-or and band-pass filtering where the optical signal is also typical NRZ modulated signal.

In general, the transmission error rate is the ratio of the number of error bits to the total number of bits received at the receiving end. Generally the larger the optical power input in the receiving end is, the lower the error rate is. Therefore, to discuss merits and demerits of the two clock extraction methods, error rates at the same input optical powers are compared or the magnitudes of two input optical powers having the same error rate are compared. Thereby, in FIG. 12, error rates measured by the two clock extraction methods are displayed, respectively, by changing the received power when 240 km transmitted optical signals are input to the receiving end.

In FIG. 12, the horizontal axis shows the received optical power displayed in dBm unit. 0 dBm means 1 mW, −10 dBm means 0.1 mW, and −20 dBm means 0.01 mW. The vertical axis shows a common log value of the measured error rate. For example, −10 of the vertical axis means that the error rate is $10^{-10}$.

The error rate (▲) of data recovery by the present invention shows 100 times lower error rate at the same optical input power and 3 dB lower input power at the same error rate than that of the conventional method (■) using the exclusive-or logic. That is, data recovery result where the clock signal is extracted from the optical data transmitted from the transmitter according to the present invention is very superior in comparison to the conventional method.

As described above, in an NRZ optical signal generation apparatus and method according to the present invention, NRZ optical modulation is performed by combining electrical clock signal and the electrical NRZ data at the sending end and the signal distortion was optimized by controlling the magnitude and phase of the clock signal. Thereby, at the receiving end, the clock signal can be extracted using a low price band-pass filter component easy to manufacture instead of a high price PLL component difficult to manufacture and data can be clearly recovered. Therefore, a receiver structure for clock extraction is simpler, an error rate of data recovery is lower by clearly extracting the clock signal, and transmission distance of an optical signal is longer.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical system comprising:

a data transmitter generating a non return to zero (NRZ) optical signal with clock component amplification, including:

an attenuator which attenuates the magnitude of an electrical clock signal, a phase shifter which controls a phase of the magnitude-attenuated electrical clock signal, a combiner which electrically combines the phase-controlled electrical clock signal and electrical NRZ data, a driver which amplifies the magnitude of the combined signal, an optical modulator which performs optical modulation; and a receiver including a narrow band band-pass filter that operates to extract the clock signal from the NRZ optical-modulated signal for clock recovery after detection;

wherein the optical modulator generates a clock component amplified NRZ optical signal based on the phase-controlled electrical clock signal and the electrical NRZ data.

2. A method comprising:

generating an NRZ optical signal with clock component amplification, attenuating the magnitude of an electrical clock signal;

controlling the phase of the magnitude-attenuated electrical clock signal;

combining the phase-controlled electrical clock signal and electrical NRZ data;

amplifying the magnitude of the combined signal;

performing an NRZ optical modulation using the combined signal amplified by the driver;

generating a clock component amplified NRZ optical signal based on the phase-controlled electrical clock signal and the electrical NRZ data; and extracting the clock signal from the NRZ optical-modulated signal for clock recovery by a narrow band band-pass filter included in a receiver.

* * * * *